United States Patent Office 3,446,721
Patented May 27, 1969

3,446,721
PROCESS FOR PREPARING TRIFLUORO-ACETYL CHLORIDE
Otto Scherer, Bad Soden, Taunus, and Jurgen Korinth and Peter-Paul Rammelt, Hofheim, Taunus, Germany, assignors to Farbwerke Hoechst Aktiengesellschaft vormals Meister Lucius & Bruning, Frankfurt am Main, Germany, a corporation of Germany
No Drawing. Filed July 22, 1966, Ser. No. 567,069
Claims priority, application Germany, Aug. 13, 1965, F 46,891
Int. Cl. C07c *53/16, 51/32;* B01j *1/10*
U.S. Cl. 204—158                             4 Claims The present invention relates to a process for preparing trifluoroacetyl chloride.

It is known to oxidize hexafluoro-2,3-dichlorobutene with a mixture of chromic acid and sulfuric acid. As main product the reaction yields hexafluoro-diacetyl and dichlorohexafluorobutanediol sulfate.

The present invention provides a process for preparing trifluoroacetyl chloride which comprises reacting hexafluorodichlorobutene with molecular oxygen in ultraviolet light.

The oxidation sets in at very low temperatures, namely −30° C. and there below and, when carried out at atmospheric pressure, it can be performed at raised temperature of up to about 70° C. (boiling point of hexafluorodichlorobutene). Temperatures in the range of from −20° C. to +70° C. are preferred. When the reaction is carried out at elevated pressure, the reaction temperature may still be higher, for example 100° C.

For 1 mole of hexafluorodichlorobutene approximately 1 mole of $O_2$ is required, an oxygen excess being also possible. It is appropriate, however, to avoid an oxygen excess because the unreacted oxygen would entrain a partial pressure of trifluoroacetyl chloride so that for maintaining the yield the reaction mixture must be cooled to very deep temperatures. The same applies to the use of oxygen-containing gases, for example air, which is likewise possible.

The oxidation is carried out in a manner known for oxidations under irradiation. Gaseous oxygen is passed through the starting material, suitably by means of a frit, optionally while stirring. The escaping gases are conducted, for example, into a fractionating column where the desired reaction product trifluoroacetyl chloride is separated from higher boiling compounds, especially the starting material. The unreacted oxygen is suitably conducted in a cycle by means of a pump and fresh oxygen is additionally introduced in the measure as it is consumed so that only a weak gas current escapes from the system, which may be controlled by a bubble recorder according to which the oxygen supply may be regulated.

It is expedient to take up the main quantity of the reaction heat, especially the heat of radiation, by cooling the reaction vessel or the source of light, for example with cooling water and so to relieve the condenser of the fractionating column.

Trifluoroacetyl chloride is a valuable intermediate product for a plurality of syntheses. According to known processes it is difficult to produce. Therefore, the process of the invention offers an industrial progress.

The following examples serve to illustrate the invention but they are not intended to limit it thereto.

EXAMPLE 1

Over a period of 14 hours 3–5 liters/hour of $O_2$ were passed through a reaction vessel with mounted reflux condenser and containing 130 g. of $CF_3CCl=CClCF_3$ (=0.558 mole), while irradiating with ultraviolet light. During this time the reaction temperature dropped from about +70° C. to about −20° C.

Fractionation of the product obtained yielded 84 grams =0.635 mole of $CF_3COCl$, 20 grams of starting product and 32 grams of residue. The yield, therefore, amounted to 67.2%, the conversion to 84.5%.

EXAMPLE 2

A reaction vessel was charged with 25 parts by weight of hexafluorodichlorobutene. While irradiating with ultraviolet light there were introduced per hour 0.7 part by weight of oxygen through a frit and 0.62 part by weight of hexafluorodichlorobutene.

The formed trifluoroacetyl chloride was continuously distilled off through a mounted column with dry ice cooling at a head temperature of about −19° C. There was obtained 0.72 part by weight of trifluoroacetyl chloride per hour, corresponding to a yield of 73% calculated on the amount used. After a reaction period of 105 hours 14.6 parts of residue remained behind, 38% of which consisted of unreacted starting material. From this result a yield of 78% could be calculated, referred to the reacted hexafluorodichlorobutene.

EXAMPLE 3

A reaction vessel was charged with 165 grams=0.709 mole of hexafluorodichlorobutene. While irradiating with ultraviolet light further 232 grams=0.995 mole of $CF_3CCl=CClCF_3$ were added over a period of 15.75 hours and oxygen was passed through in an amount of about 70 liters per hour. The oxygen was conducted in a cycle and fresh oxygen was added in such an amount that a weak current of off-gas escaped.

Over a mounted fractionating column a total amount of 332 grams=2.508 moles of $CF_3COCl$ were discharged continuously. A residue of 112 grams remained behind from which 35 grams=0.307 mole of $CF_3COOH$ could be obtained and which still contained 5 grams of starting material. Thus a total of 2.815 moles was obtained as $CF_3COCl$ and $CF_3COOH$, i.e. 82.5%, calculated on the amount used, or 83.6% calculated on the conversion.

What is claimed is:
1. A process for preparing trifluoroacetyl chloride which comprises reacting hexafluorodichlorobutene with molecular oxygen while irradiating with ultraviolet light.
2. The process of claim 1, which comprises carrying out the reaction at a temperature within the range of from −20° C. and the boiling point of hexafluorodichlorobutene of +70° C. at atmospheric pressure.
3. The process of claim 1, which comprises carrying out the reaction at elevated pressure and at a temperature of about 100° C.
4. The process of claim 1, which comprises using about 1 mole of $O_2$ for 1 mole of hexafluorodichlorobutene.

References Cited

UNITED STATES PATENTS 3,320,142   5/1967   Scherer et al. _____ 204—158

HOWARD S. WILLIAMS, *Primary Examiner.*